United States Patent
Lagares Cominas

(10) Patent No.: US 7,410,414 B2
(45) Date of Patent: Aug. 12, 2008

(54) TENDERISING MACHINE

(75) Inventor: Narcis Lagares Cominas, Girona (ES)

(73) Assignee: Metalquimia, S.A., Girona (ES)

( * ) Notice: Subject to any disclaimer, the term of this patent is extended or adjusted under 35 U.S.C. 154(b) by 0 days.

(21) Appl. No.: 10/580,632

(22) PCT Filed: Nov. 24, 2003

(86) PCT No.: PCT/ES03/00591

§ 371 (c)(1),
(2), (4) Date: Feb. 26, 2007

(87) PCT Pub. No.: WO2005/048723

PCT Pub. Date: Jun. 2, 2005

(65) Prior Publication Data

US 2007/0249274 A1 Oct. 25, 2007

(51) Int. Cl.
*A22C 9/00* (2006.01)
(52) U.S. Cl. ..................................... 452/142
(58) Field of Classification Search ......... 452/141–144, 452/135, 136
See application file for complete search history.

(56) References Cited

U.S. PATENT DOCUMENTS

| | | | | |
|---|---|---|---|---|
| 2,243,492 A | * | 5/1941 | Wilson | 452/142 |
| 3,654,664 A | * | 4/1972 | Fetzer et al. | 452/141 |
| 3,716,893 A | * | 2/1973 | Vogelsang | 452/142 |
| 4,343,067 A | | 8/1982 | Shelton | |
| 4,437,208 A | | 3/1984 | Sampson | |
| 4,660,252 A | | 4/1987 | Blackburn et al. | |
| 5,114,379 A | * | 5/1992 | Prosenbauer | 452/142 |
| 6,257,132 B1 | | 7/2001 | Bifulco | |
| 6,601,499 B1 | | 8/2003 | Bifulco | |

FOREIGN PATENT DOCUMENTS

| | | |
|---|---|---|
| EP | 0 478 221 A1 | 4/1992 |
| ES | 8406161 | 11/1984 |
| GB | 628048 | 8/1949 |

OTHER PUBLICATIONS

International Search Report for PCT International Application No. PCT/ES2003/000591 mailed Aug. 3, 2004.

* cited by examiner

*Primary Examiner*—Thomas Price
(74) *Attorney, Agent, or Firm*—RatnerPrestia

(57) ABSTRACT

The invention relates to a tenderizing machine which is designed to tenderize deboned meat pieces. The inventive machine is equipped with two stacked tenderizing assemblies, each of the assemblies comprising an integrated pair of rotating rollers which are provided with cutting members that extend out from the periphery thereof and which are disposed close to one another, such as to define an adjustable-size opening. In addition, at least one of the rollers of each assembly is supported such that it can move away from the other roller against an opposer as the meat pieces move between said two rollers. Moreover, each of the tenderizing assemblies is equipped with respective controls for adjusting the distance between the cutting members of each pair of rollers and for selectively blocking the movement of at least one of the moving rollers of each of the assemblies.

18 Claims, 7 Drawing Sheets

TENDERISING MACHINE

This application is a U.S. National Phase application of PCT International Application No. PCT/ES2003/000591 filed Nov. 24, 2003.

SCOPE OF THE INVENTION

This present invention refers to a tenderiser machine applicable to the processing of pieces of boned meat that may or may contain fatty materials or other loads.

The machine in question is an auxiliary assembly in the process of preparing cooked ham and is intended to increase the effective surface area for the extraction of muscle proteins during subsequent massage processes. Its operation, performing a series of superficial or deep cuts in the piece of meat that passes through a series of tenderisers, such as rotating rollers located at a small distance, subjecting it to compression and stretching, improves muscle protein extraction, resulting in improved adhesion between the muscles and between the former and the pieces of fat or rind incorporated into the meat mass. It is also especially useful in treating pieces with a high content in nerves and Tendons, for example, pigs' trotters and turkey drumsticks. In those cases in which the cited pieces of meat include substances such as brine and/or other loads, for example, by injection, the processing provided by this machine, assists in improved distribution of the brine and/or loads in the meat mass.

BACKGROUND TO THE INVENTION

The state of the art describes various meat mass tenderising machines applied to the explained function.

In particular, a machine is known that consists of a pair of parallel, tenderising rollers, located at a short distance and rotated in opposite directions by a motor with the said rollers fitted with a number of cutting members, such as prongs or blades emerging from their surfaces, defining an elongated aperture through which the pressed meat passes, driven by the said rollers and gravity. It has been arranged in this machine that one of the rollers is associated, by its support ends to some means of elastic load, with limited travel, so that it can move or give way, moving away from the other twin roller, mounted in a fixed manner on a bed of the machine, during the passage of the pieces of meat.

The invention proposes to improve the performance of such a machine, permitting a more efficient job on the meat mass to be treated and especially providing great variability of the operating conditions to achieve improved adaptation of the actual characteristics of each batch of meat product to be treated.

BRIEF DESCRIPTION OF THE INVENTION

Essentially, this invention is based on the combination of at least two tenderising assemblies, each comprising a basic structure of two tenderising rollers, like that described in the background just described, although with the possibility of selective differentiated regulation of relative movement of one of the cited tenderising elements or rollers on each assembly, which can give way against some antagonist means or remain fixed in place, so that the meat material processing can be carried out under different conditions in each of the tenderising assemblies.

To this end, the invention, in a preferred embodiment example, comprises:

two superposed tenderiser assemblies A and B, each integrating a pair of axial-development tenderising elements or rollers, with a number of cutting members, such as prongs or blades emerging from its surface, which are rotated, with the tenderising elements close together, defining an aperture with regulable amplitude and with at least one of the said tenderiser elements from each assembly A and B supported with the possibility of limited run movement with respect to the other tenderiser element, acting against some elastic antagonist means during the passage of the pieces of meat which are pulled along and pass between the two tenderiser elements by gravity.

some means, on each of the said tenderiser assemblies A and B, of individual regulation of the distance between the cutting members of each pair of tenderiser rollers and to selectively block the relative movement, with respect to the said tenderiser element aperture that can move, on each of the A and B assemblies.

In particular, it has been arranged to fix the tenderiser element that can move of one or both A and B assemblies and also so the distance between the tenderiser element of the A and B assemblies is either the same or different.

Other characteristics of the invention will become clearer in the detailed explanation of some embodiment examples given below.

A BRIEF DESCRIPTION OF THE DRAWINGS

The foregoing summary, as well as the following detailed description of a preferred embodiment of the invention, will be better understood when read in conjunction with the appended drawings, which are incorporated herein and constitute part of this specification. For the purposes of illustrating the invention, there are shown in the drawings an embodiment that is presently preferred. It should be understood, however, that the invention is not limited to the precise arrangements and instrumentalities shown. In the drawings, the same reference numerals are employed for designating the same elements throughout the several figures. In the drawings:

DETAILED EXPLANATIONS OF SOME EMBODIMENT EXAMPLES

Figure 1:
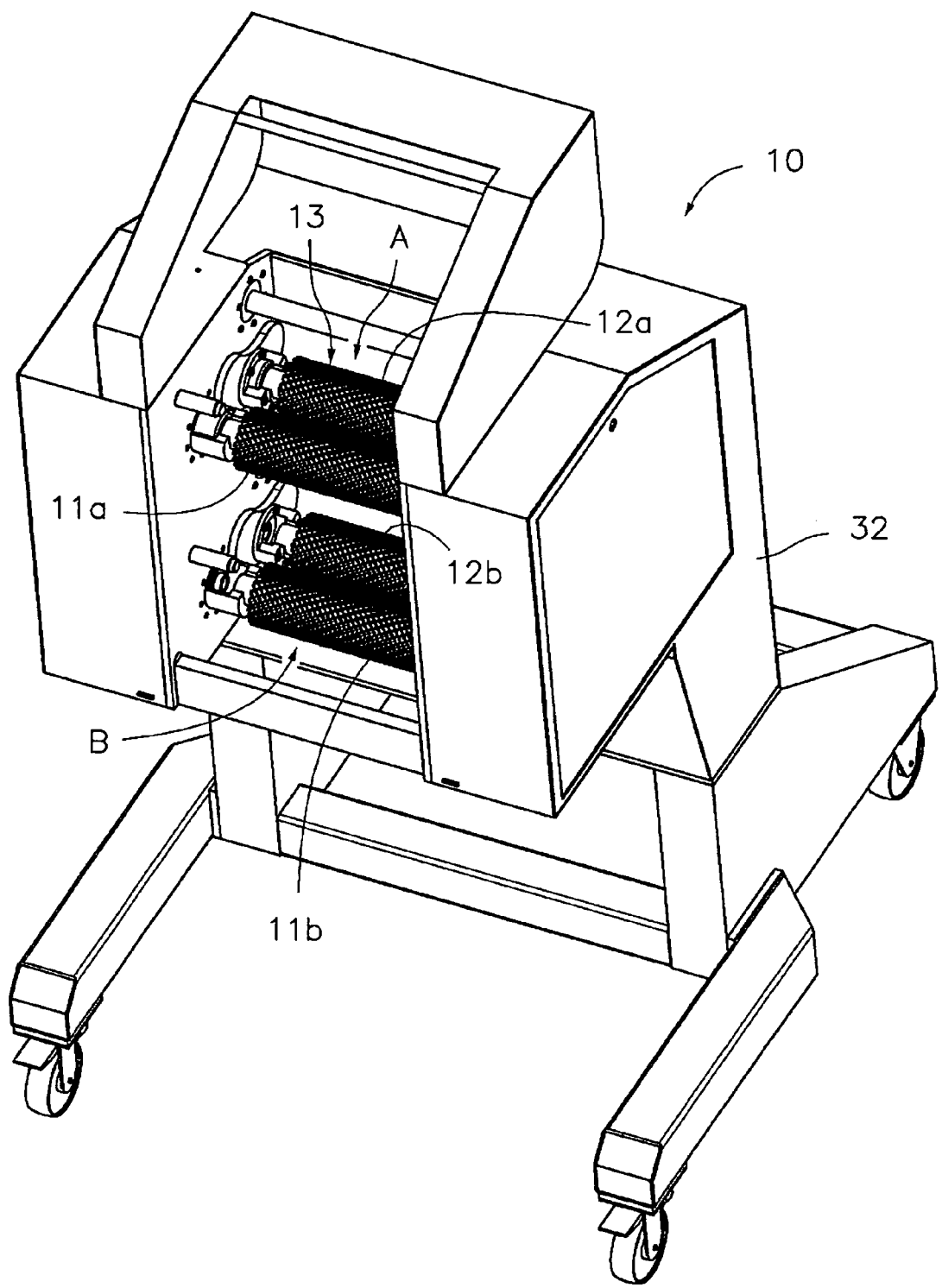
FIG. 1 is a perspective view of the machine, showing the two incorporated tenderiser element assemblies, together with their relative layout.
Figure 2:
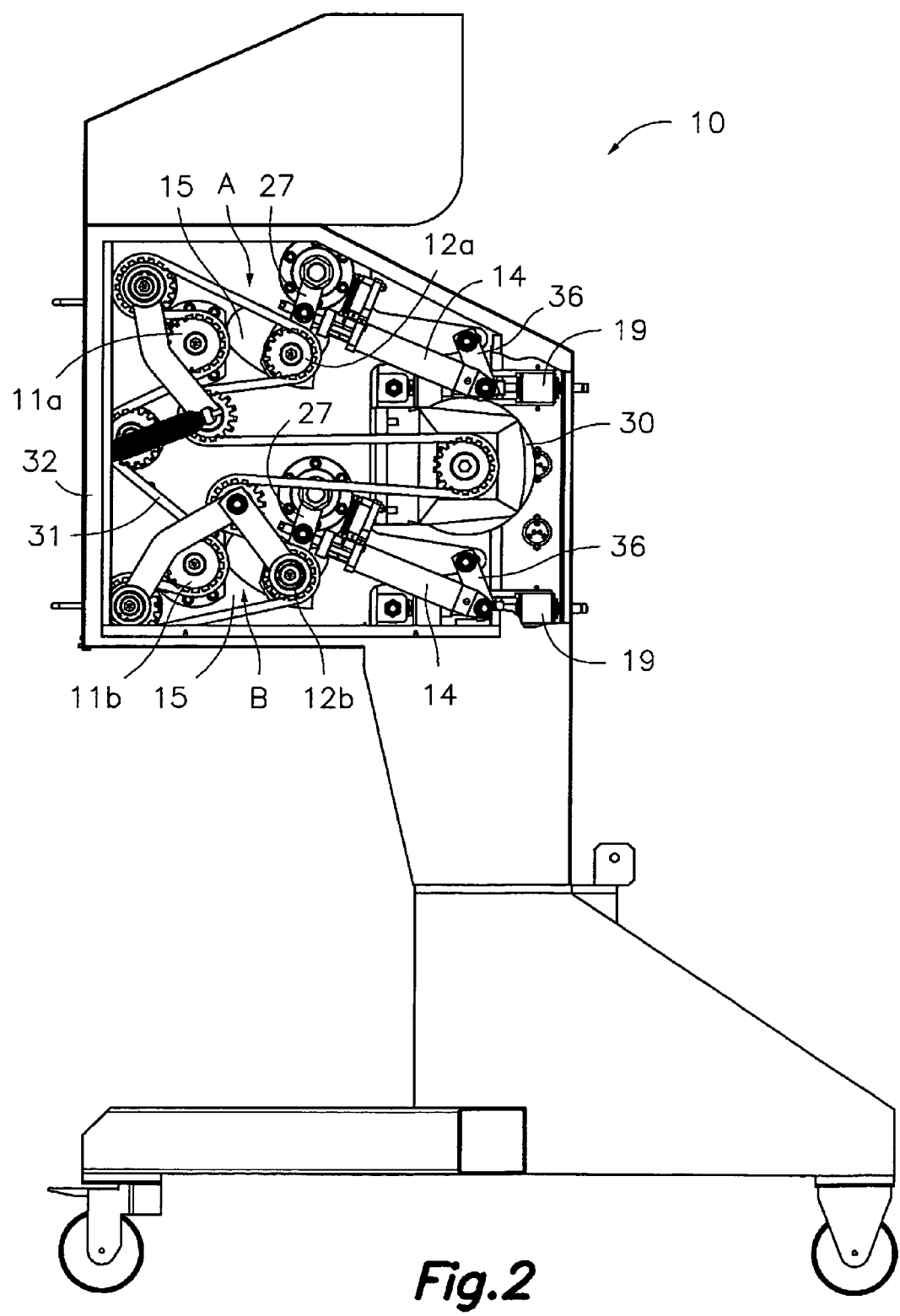
FIG. 2 is a lateral elevation view, with the tenderiser elements separated, illustrating the relative layout of most of the component elements and their functional interrelation, in particular, the assembly layout and rotational operation of the tenderiser elements.
Figure 3:
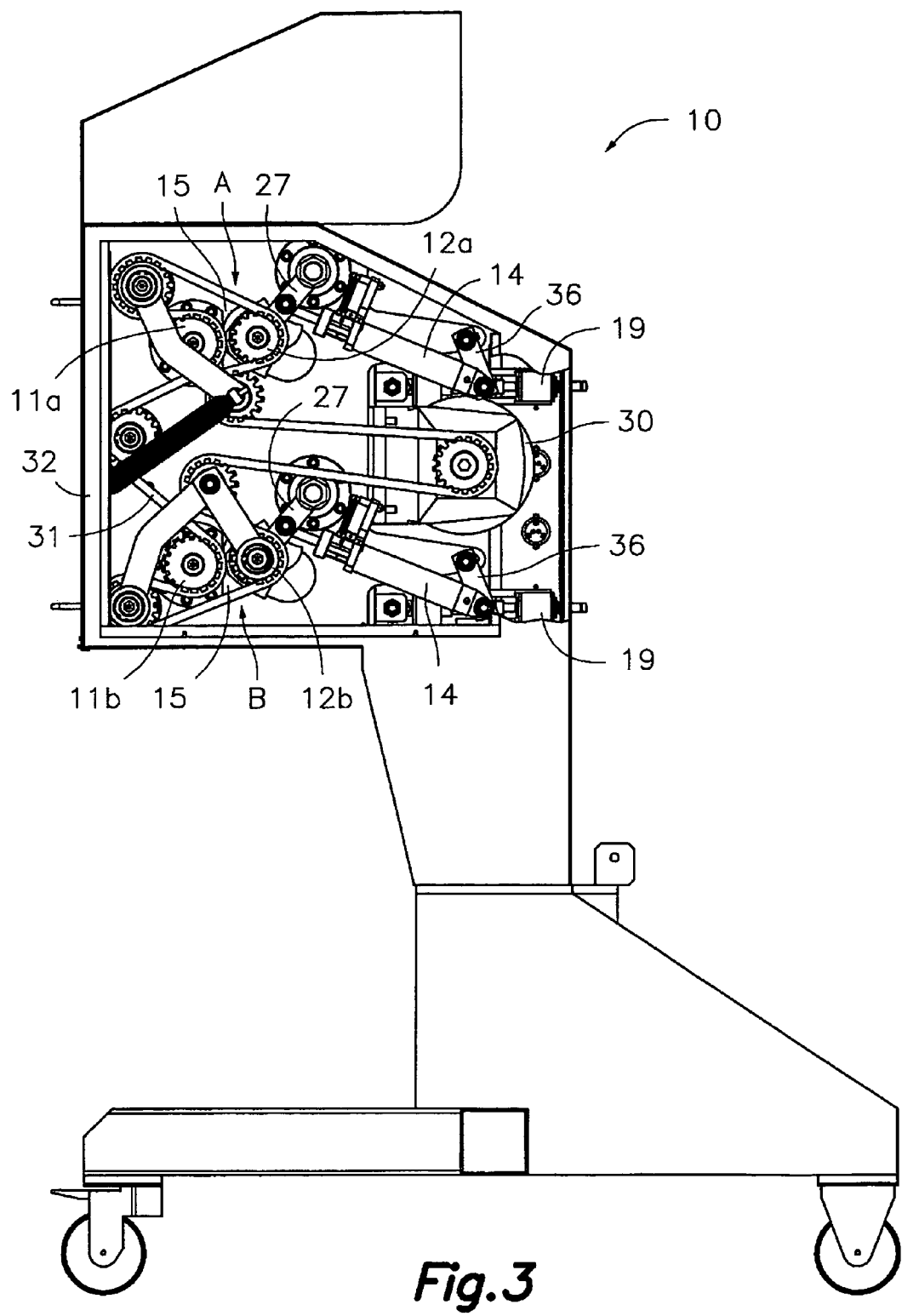
FIG. 3 is equivalent to the previous view, although with the tenderiser elements in their operational layout, in other words, with their cutting elements close together.
Figure 4:
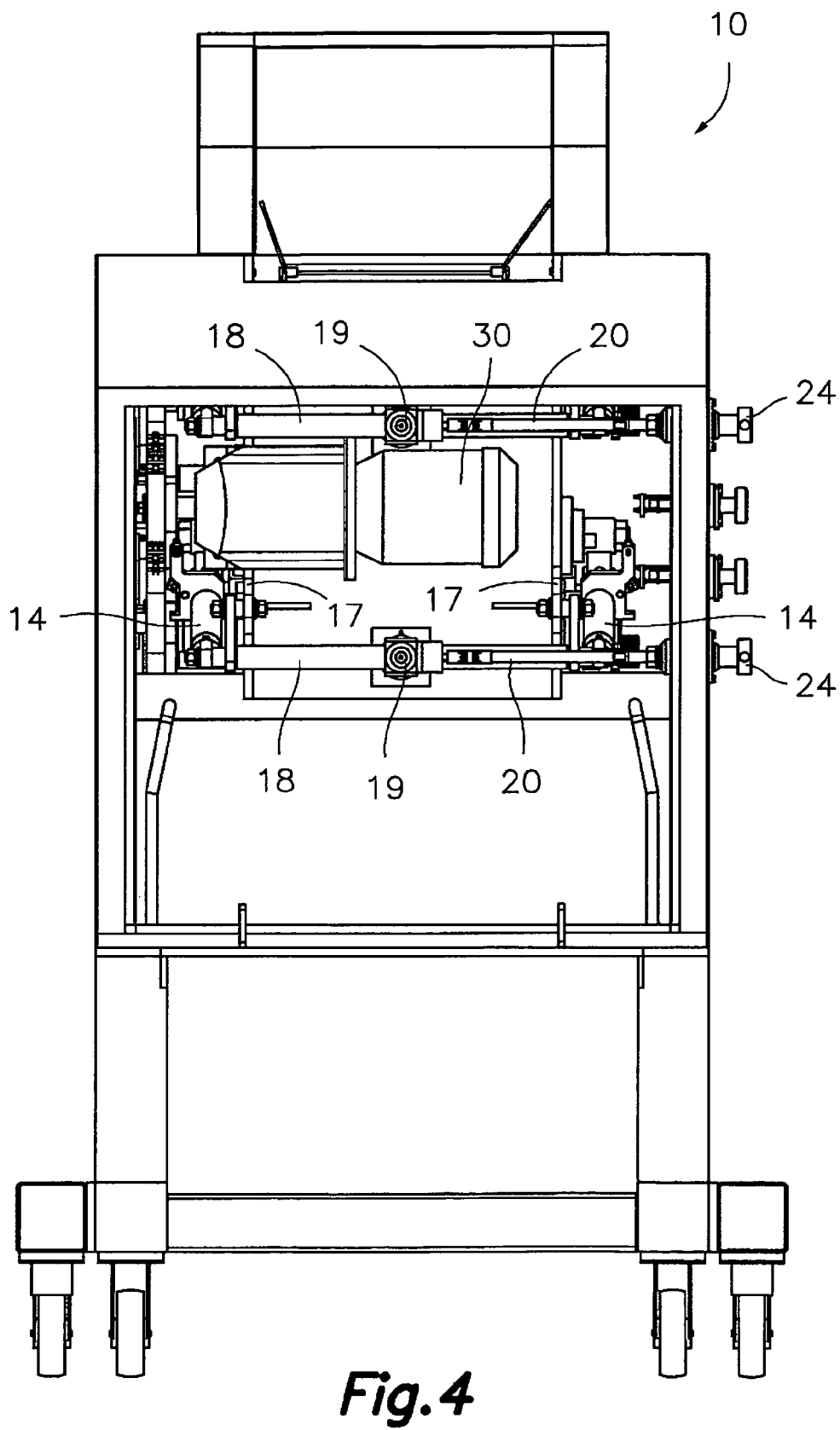
FIG. 4 is a rear elevation view of the machine assembly, showing the geared drive motor and part of the individual means of regulating each tenderiser assembly.

In accordance with the previous description and just as can be seen in FIGS. 1 to 3, the tenderiser machine covered by this invention is applicable to the processing or tenderisation of boned pieces of meat, containing fatty materials and other load or not, and comprising at least two superposed tenderiser assemblies. Each of the said tenderiser assemblies A and B includes a pair of tenderiser elements 11a-12a, 11b-12b, comprising of rollers 11a-12a, 11b-12b, with a number of cutting members, such as prongs or blades 13 emerging from their peripheral surfaces. In general, the cited rollers 11a-12a, 11b-12b are rotated. In each assembly A and B, the rollers 11a-12a, 11b-12b are set out in a proximity relationship, defining an aperture 15 between the two with regulable amplitude and at least one of the rollers 12a, 12b of each assembly A and B is supported with the possibility of moving further away with respect to the other roller ha, lib acting against some antagonist means. Thus, during the passage of the pieces of meat which are pulled along in cooperation with gravity between both rollers of each set, the movable roller moves to adapt to any thickness variations in the pieces of meat.

The machine includes some means for each of the said tenderiser assemblies A and B to regulate the distance between the cutting members 13 of each pair of rollers 11a-12a, 11b-12b and to selectively block the movement of at least one 12a, 12b of the movable rollers for each assembly A, B. In a preferred embodiment example, both tenderiser rollers 12a, 12b can be selectively blocked so that the machine allows combined processing of the two tenderiser assemblies A and B, with one or both rollers 12a, 12b of the corresponding blocking assemblies and also with the same or different distance between the rollers of each assembly. In a preferred embodiment example of the invention, the cited antagonistic means have an elastic nature.

In accordance with an embodiment example, at least one of the said rollers 11a-12a, 11b-12b for each assembly A, B is governed in rotation by some means of motor-drive, and in an embodiment example, all the rollers are rotated, with the two elements 11a-12a, 12a-12b of each assembly A and B, rotating in opposite directions and with different rotational speeds, so that they cooperate in the pull of the incoming pieces of meat and produce a stretching effect on them.

The mentioned means of motorised drive comprises at least one geared motor assembly 30, together with a flexible transmission 31. As can be seen from the elevation views in FIGS. 2 and 3, a single geared motor assembly 30 and a single flexible transmission 31 are employed to produce the rotational drive for all rollers 11a-12a, 11b-12b for the machine 10, which are transversally arranged to the passage of the pieces of meat, in mutual parallelism and on different levels, and driven by a pulling element fitted to one of its ends and coupled to the said flexible transmission 31. The two superposed tenderiser assemblies A and B are laid out so that the apertures 15 for the passage of the pieces of meat are vertically aligned or present a certain lack of phase between the said apertures.

In accordance with a preferred embodiment example shown in FIGS. 2 and 3, the rollers 11a-12a, 11b-12b are supported at their ends. One of the rollers 11a, 11b from each tenderiser assembly A, B is supported in a fixed fashion to a machine bed 32, while the movable rollers 12a, 12b for each assembly A, B are coupled to a pivoting articulated lever 27 which, in its mid zone is connected to a pusher assembly 25 consisting of a shaft that is coupled to an elastically loaded element contained in a support casing 14.

Figure 5:
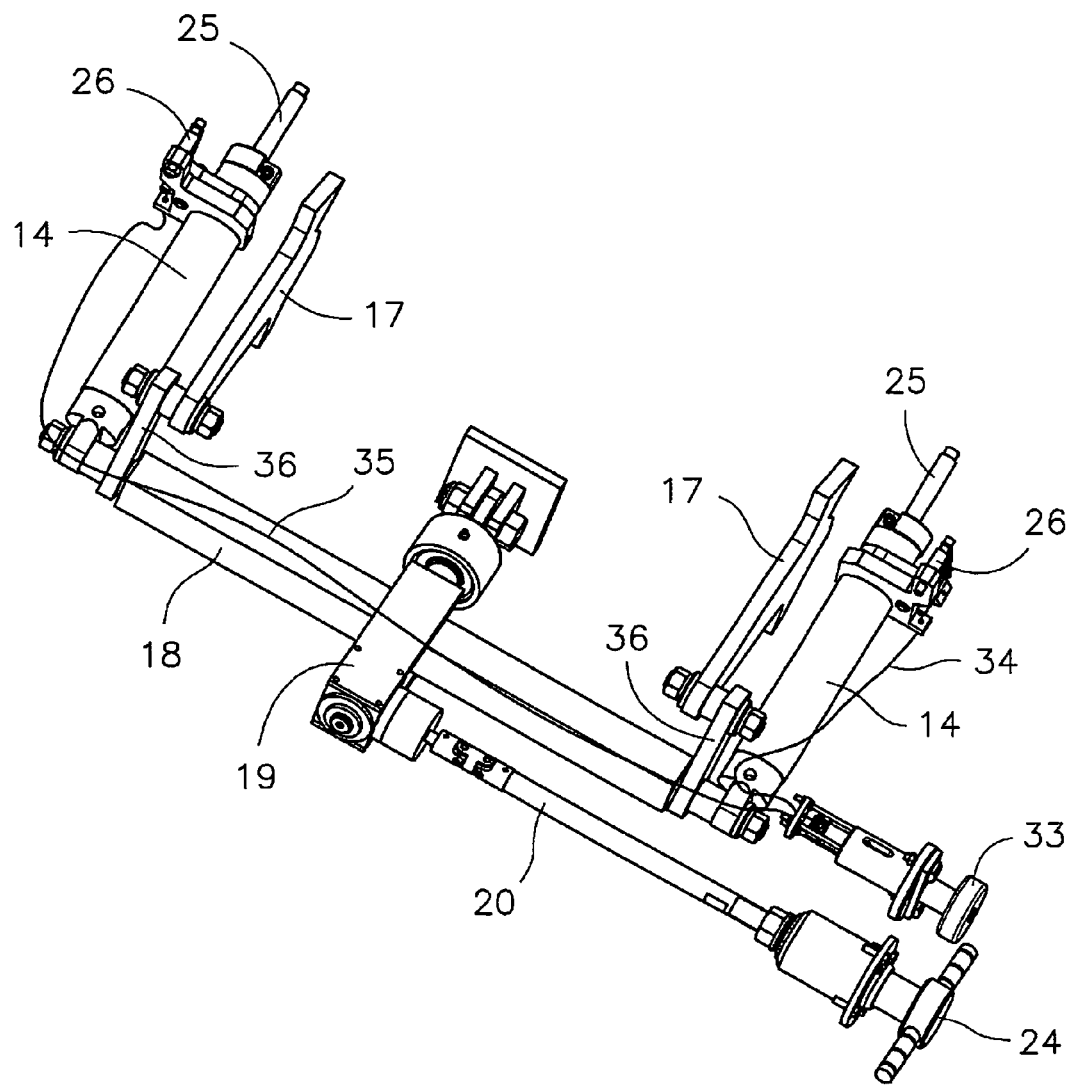
FIG. 5 is a perspective view of the positional regulation means for one of the tenderiser elements of either of the tenderiser assemblies.
Figure 6:
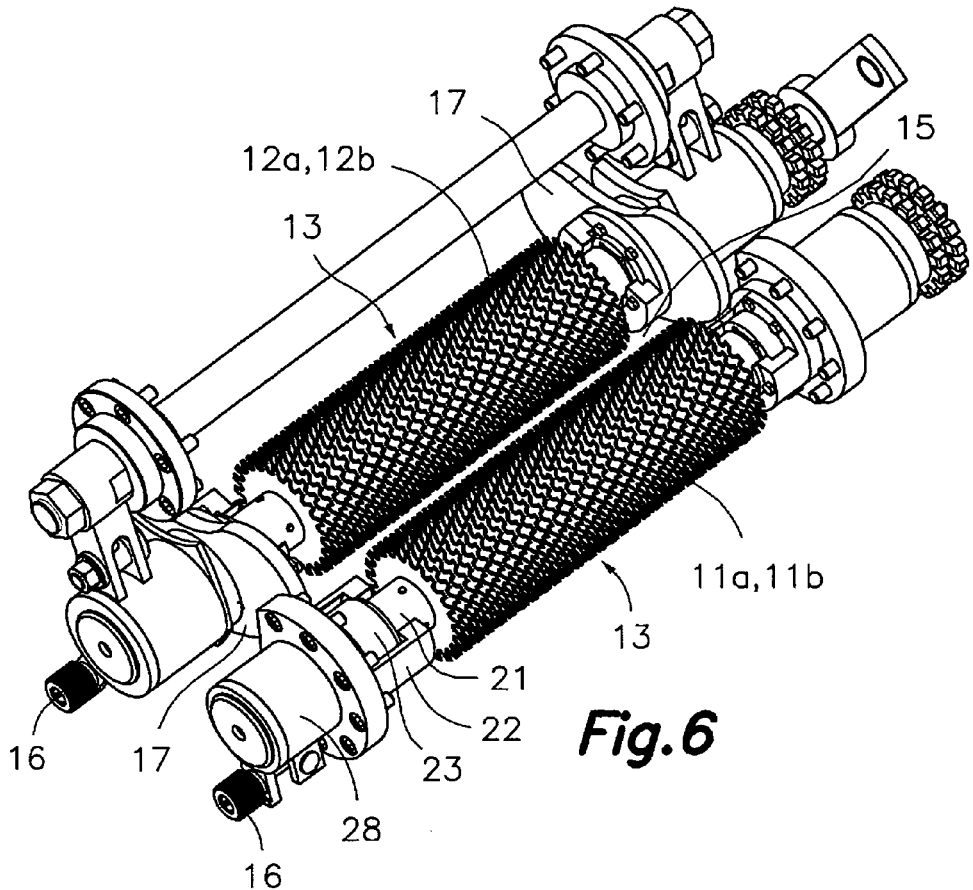
FIG. 6 is a perspective view that shows one of the tenderiser assemblies, with specific details of the support elements at their ends.
Figure 6A:
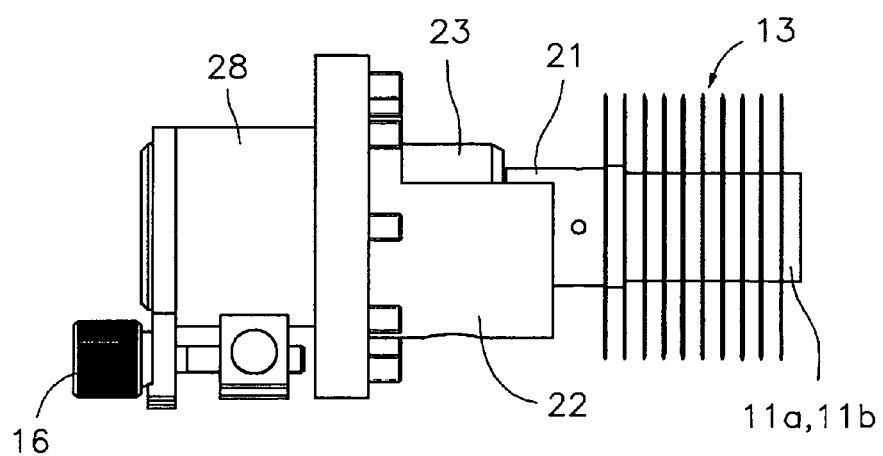
FIG. 6a shows a partial diagrammatic elevation of one of the tenderiser elements in its installed layout associated with one of the end supports.
Figure 7:
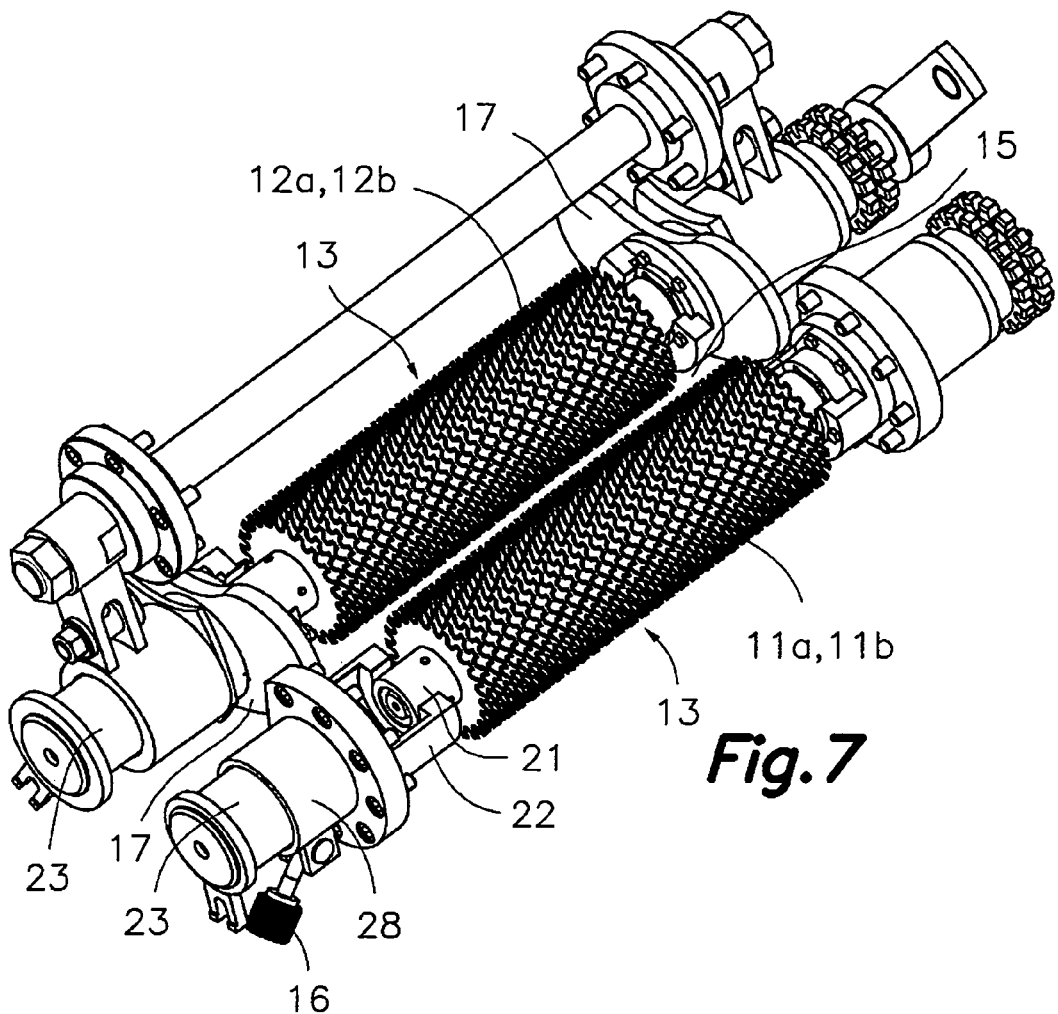
FIGS. 7 and 7a are equivalent to FIGS. 6 and 6a and show the freed situation of the tenderiser elements through one of its ends and by means of a lever-driven system.
Figure 7A:
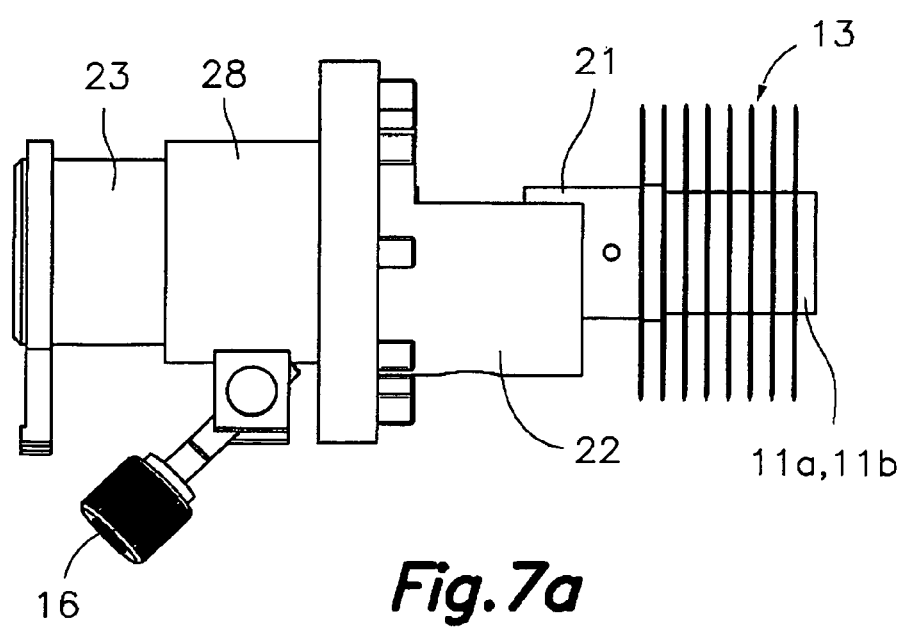

As can be seen in FIG. 5, the support casings 14 associated with the respective ends of each movable roller 12a, 12b of the assemblies A and B are coupled by a transversal retaining rod 18 that is connected by both ends to some levers 36 articulating to some supports 17 coupled to the machine bed 32, with the said retaining rod 18 in turn related to a mechanism 19 that controls its relative position with respect to the bed 32 and regulable from one side of the machine 10 by means of a wheel 24 through a transmission element 20.

The said FIG. 5 also shows details of some means to selectively disable the movement of each one of the pusher elements 25 of the movable rollers 12a, 12b. These means consist of a stop 26 that can be interposed in the path of the said pusher element 25 to immobilise it. The stops 26 are remotely operated from a wheel 33 by a flexible transmission that includes some sheathed cables 34, 35.

Referring to FIGS. 6, 6a and 7, 7a, these show that each of the said tenderiser rollers 11a-12a, 11a, 11b are comprised of an axial development body terminating in two end journals 21 that rest on two supports comprising a seating bowl 22 and a securing bowl 23, which can superposed on the previous by rotation and/or linear movement with respect to a support bushing 28. A lever and thread mechanism 16 permits the securing bowl 23 to be fixed in an operational position (shown in FIGS. 6 and 6a), in which the corresponding roller is retained and guided to rotate or free the securing bowl 23 (situation shown in FIGS. 7 and 7a), which facilitates roller extraction for cleaning and maintenance jobs.

The illustrated and described embodiment example is merely for illustrative purposes and does not limit the scope of this invention, the scope of which is defined by the attached claims.

The invention claimed is:

1. A tenderising machine applicable to the processing of pieces of boned meat, containing or not fatty materials or other loads, comprising:
   at least two superposed tenderiser assemblies A and B, each comprising a pair of rotatable axial-developed tenderising elements, with a number of cutting members, such as prongs or blades emerging from its surface, with the tenderising elements positioned close together, each pair of tenderising elements a defining a respective aperture with regulable amplitude and with at least one of the said tenderiser elements from each assembly A and B supported and adapted to move further away with respect to the other tenderiser element, said moveable tenderising elements adapted to be responsive to a load element during the passage of the pieces of meat which are pulled along by said pair of tenderising elements and pass from said first pair of tenderising elements to said second pair of tenderising elements by gravity;
   means for each of the said tenderiser assemblies A and B to regulate the distance between the cutting members of each pair of tenderising elements and to selectively block the movement of said at least one movable tenderising element for each assembly A, B.

2. A machine in accordance with claim 1, wherein at least one of the said tenderiser elements of each assembly A, B is governed in rotation by a motorised drive means.

3. A machine in accordance with claim 2, wherein the tenderiser elements are rotated, with the two tenderising elements of each assembly A and B, rotating in opposite directions and with different rotational speeds, so that they cooperate in the pull of the incoming pieces of meat and produce a stretching effect on them.

4. A machine in accordance with claim 2, wherein said means of motorised drive comprises at least one geared motor assembly and at least one flexible transmission.

5. A machine in accordance with claim 2, further comprising a single geared motor assembly and a single flexible transmission with all tenderiser elements for the machine transversally arranged to the passage of the pieces of meat, in mutual parallelism and on different levels, and driven by a pulling element fitted to one end of the each of the tenderising elements and coupled to the said flexible transmission.

6. A machine in accordance with claim 1, wherein said load element has an elastic nature.

7. A machine in accordance with claim 6, wherein said means of motorised drive comprises at least one geared motor assembly and at least one flexible transmission.

8. A machine in accordance with claim 6, further comprising a single geared motor assembly and a single flexible transmission with all tenderiser elements for the machine transversally arranged to the passage of the pieces of meat, in mutual parallelism and on different levels, and driven by a pulling element fitted to one end of the each of the tenderising elements and coupled to the said flexible transmission.

9. A machine in accordance with claim 1, wherein said superposed tenderiser assemblies A, B are arranged with vertical alignment of the apertures for passage of the pieces of meat.

10. A machine in accordance with claim 1, wherein said superposed tenderiser assemblies A, B are arranged with out-of-phase alignment of the apertures for passage of the pieces of meat.

11. A machine in accordance with claim 1, wherein a tenderiser element of each tenderiser assembly A, B is supported in a fixed fashion on a machine bed.

12. A machine in accordance with claim 11, wherein the tenderiser elements of each tenderiser assembly A, B has parallel geometric axes.

13. A machine in accordance with claim 11, wherein the tenderiser elements are supported at their ends and the movable rollers tenderiser elements for each assembly A, B are coupled to a pivoting articulated lever which, in its mid zone is connected to a pusher assembly.

14. A machine in accordance with claim 13, wherein each of said tenderiser elements are comprised of an axial development body terminating in two end journals that rest on some supports comprising a seating bowl and a securing bowl, with said securing bowl adapted to be superposed on the seating bowl by rotation and/or linear movement and which can be fixed/freed by a retaining mechanism.

15. A machine in accordance with claim 13, wherein said pusher assembly comprises a shaft that is connected to an elastically-loaded element and contained in a support casing.

16. A machine in accordance with claim 15, wherein the support casings associated with the respective ends of each movable tenderiser element of the assemblies A and B are coupled by a transversal retaining rod that is connected by both ends to levers articulating to supports coupled to a machine bed, with the said retaining rod in turn related to a mechanism that controls its relative position with respect to the bed and regulable from one side of the machine by a wheel through a transmission element.

17. A machine in accordance with claim 13, further comprising means to selectively disable the movement of each of the pusher assemblies for the tenderiser elements, which can be moved in relation to the support casings, comprising a stop adapted to be interposed in the path of the said pusher assembly to immobilise it.

18. A machine in accordance with claim 16, wherein said stops are remotely operated from a wheel by a transmission selected from a group that includes a flexible transmission by cables.

* * * * *